US012154200B2

(12) United States Patent
Oefverstroem et al.

(10) Patent No.: US 12,154,200 B2
(45) Date of Patent: Nov. 26, 2024

(54) METHOD AND SYSTEM FOR CREATING STICKERS FROM USER-GENERATED CONTENT

(71) Applicants: Lemon Inc., Grand Cayman (KY); Douyin Vision Co., Ltd., Beijing (CN)

(72) Inventors: Thomas Oefverstroem, Singapore (SG); Kin Chung Wong, Los Angeles, CA (US); Yuyang Tian, Beijing (CN); Long Jiang, Culver City, CA (US); Christopher Juneja, Culver City, CA (US)

(73) Assignees: LEMON INC., Grand Cayman (KY); DOUYIN VISION CO., LTD., Islands Beijing (CN)

( * ) Notice: Subject to any disclaimer, the term of this patent is extended or adjusted under 35 U.S.C. 154(b) by 114 days.

(21) Appl. No.: 17/954,098

(22) Filed: Sep. 27, 2022

(65) Prior Publication Data

US 2024/0104808 A1 Mar. 28, 2024

(51) Int. Cl.
*G06T 11/60* (2006.01)
*H04L 51/046* (2022.01)
*H04L 51/52* (2022.01)

(52) U.S. Cl.
CPC ............ *G06T 11/60* (2013.01); *H04L 51/046* (2013.01); *H04L 51/52* (2022.05)

(58) Field of Classification Search
None
See application file for complete search history.

(56) References Cited

U.S. PATENT DOCUMENTS

| 10,972,682 | B1 | 4/2021 | Muenster et al. |
| 2010/0161635 | A1* | 6/2010 | Dey ................ H04L 65/612 707/758 |
| 2011/0037767 | A1* | 2/2011 | Casanova ............ H04L 51/00 345/473 |
| 2011/0107220 | A1* | 5/2011 | Perlman ............ H04N 21/2381 715/720 |
| 2013/0329060 | A1* | 12/2013 | Yim .................... H04N 23/661 348/207.1 |

(Continued)

FOREIGN PATENT DOCUMENTS

| CN | 106373170 A | 2/2017 |
| CN | 111225232 A | 6/2020 |
| CN | 112017261 A | 12/2020 |

OTHER PUBLICATIONS

International Search Report in PCT/CN2023/120203, mailed Dec. 29, 2023, 3 pages.

*Primary Examiner* — Sultana M Zalalee
(74) *Attorney, Agent, or Firm* — Astute IP Law Group

(57) ABSTRACT

Example aspects include techniques for creating video stickers from user-generated content. These techniques may include receiving selection of a video content item previously uploaded to a SMP server application corresponding to the SMP client application, and presenting a graphical user interface (GUI) for receiving one or more derivative attributes for generating a derivative video sticker from the video content item. In addition, the techniques may include adding the derivative video sticker to a library of stickers provided by the SMP server application to a plurality of SMP client applications, and presenting the derivative video sticker within a communication interface associated with the SMP server application.

20 Claims, 12 Drawing Sheets

(56) References Cited

U.S. PATENT DOCUMENTS

| | | | |
|---|---|---|---|
| 2018/0182149 A1 | 6/2018 | Chong et al. | |
| 2018/0190322 A1 | 7/2018 | Zukerman et al. | |
| 2019/0014063 A1* | 1/2019 | Melenboim | G06Q 30/0277 |
| 2019/0073801 A1* | 3/2019 | Stukalov | H04L 51/10 |
| 2019/0205015 A1* | 7/2019 | Smith | G06T 11/60 |
| 2020/0314070 A1* | 10/2020 | Barnett | G06F 3/04883 |
| 2021/0037195 A1* | 2/2021 | Cutler | H04N 5/272 |
| 2021/0352380 A1* | 11/2021 | Duncan | H04N 21/4852 |
| 2022/0068313 A1* | 3/2022 | Shafir Nir | G06V 20/48 |
| 2022/0070125 A1* | 3/2022 | Vasamsetti | H04L 51/063 |

* cited by examiner

METHOD AND SYSTEM FOR CREATING STICKERS FROM USER-GENERATED CONTENT

BACKGROUND

With the widespread adoption of digital forms of communications, the usage of stickers has rapidly increased. For example, stickers are commonly employed in social media applications and messaging applications. Some examples of stickers include animated emoticons, gifs, and other visual representations used in digital communications. As users seek more expressive digital communication experiences, many users will endeavor to create custom stickers that heighten and enrich their user experience instead of relying on stock stickers provided by developers. However, sticker creation and custom sticker usage is currently not native to social media applications and messaging applications, which negatively impacts usability and frustrates the moderation efforts of application developers.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: receiving selection of a video content item previously uploaded to a SMP server application corresponding to the SMP client application; presenting a graphical user interface (GUI) for receiving one or more derivative attributes for generating a derivative video sticker from the video content item; adding the derivative video sticker to a library of stickers provided by the SMP server application to a plurality of SMP client applications; and presenting the derivative video sticker within a communication interface associated with the SMP server application.

In some aspects, the techniques described herein relate to a method including: transmitting video content item to a SMP client application; receiving, from a first SMP client application, one or more derivative attributes for generating a derivative video sticker based on the video content item; generating the derivative video sticker based on the video content item and the one or more derivative attributes; adding the derivative video sticker to a collection of stickers provided to a plurality of SMP client applications; and presenting the derivative video sticker within a communication interface of a second SMP client application.

In another aspect, an example computer-readable medium (e.g., non-transitory computer-readable medium) storing instructions for performing the methods described herein, an example system or device configured to perform operations of the methods described herein, and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for creating video stickers from user-generated content. Aspects of the present disclosure generate custom stickers and incorporate the stickers as native elements to a social media platform. In particular, aspects of the present disclosure receive user-generated content from a social media platform, generate a customer sticker within a social media application based on the user-generated content, distribute the custom sticker to different users of the social media platform, and integrate the customer sticker into native interfaces (e.g., messaging interfaces, sticker library interfaces, etc.) of the social media application. As a result, the present disclosure may be used to introduce sticker customization to social media platforms, and/or to increase usability for users endeavoring to employ custom stickers, and/or to enable effective moderation of custom stickers.

Illustrative Environment

Figure 1:
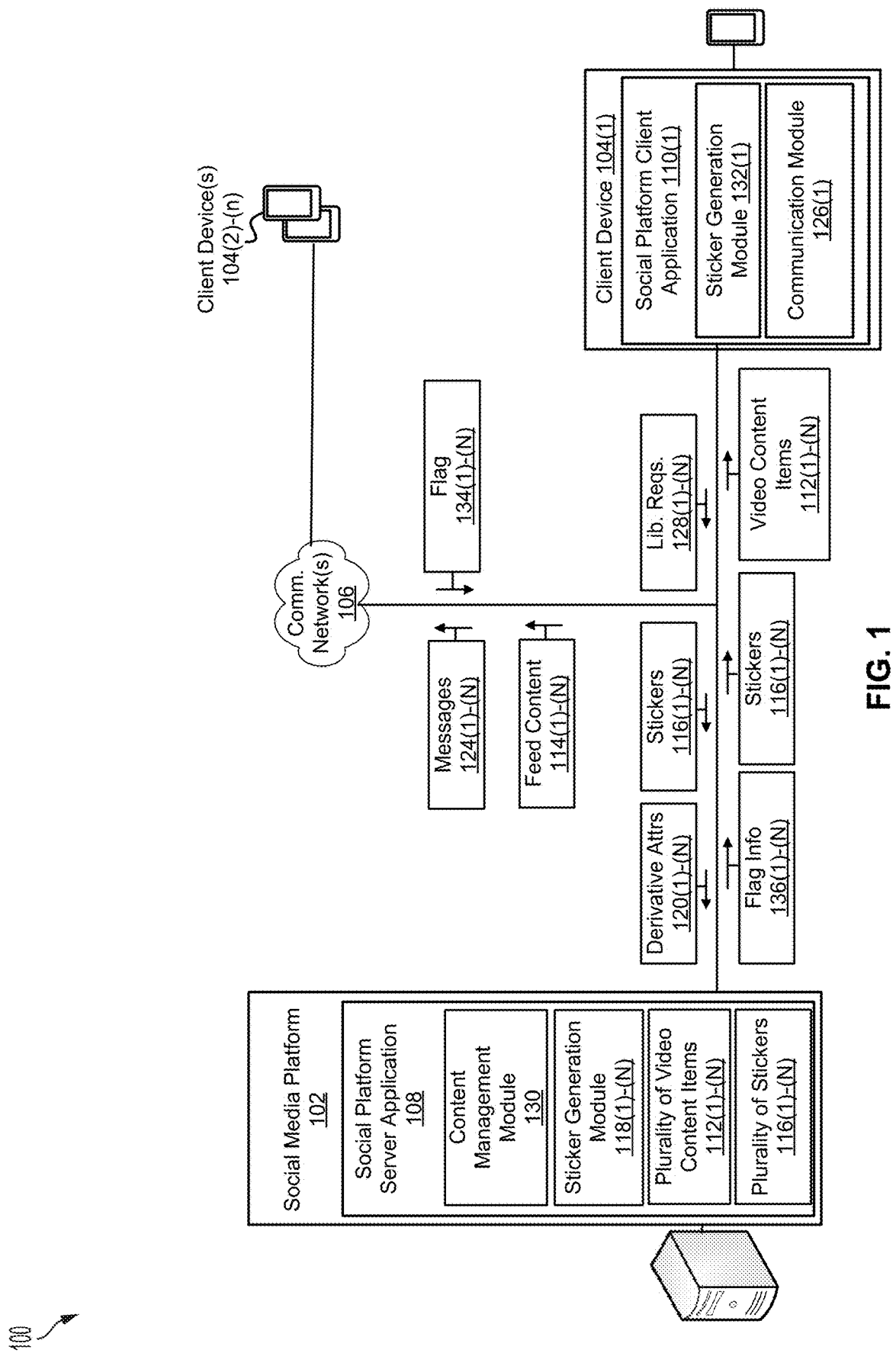
FIG. 1 illustrates an example architecture of a social media platform system, in accordance with some aspects of the present disclosure.

FIG. 1 illustrates an example architecture of a social media platform (SMP) system 100, in accordance with some aspects of the present disclosure. The SMP system 100 may be configured to provide social media applications and digital messaging services.

As illustrated in FIG. 1, the SMP system 100 may include a SMP 102 and a plurality of client devices 104(1)-(n). Some examples of the client device 104 include cellular phones, smartphones, tablets, wearable devices, desktops, workstations, virtual machines, etc. Further, the SMP system 100 may include one or more communication networks 106(1)-(n). In some implementations, the communication network(s) 106 may include one or more of a wired and/or wireless private network, personal area network, local area network, wide area network, and/or the Internet. Further, in some aspects, the SMP 102 and the plurality of client devices 104(1)-(n) may be configured to communicate via the communication network(s) 106(1)-(n).

As illustrated in FIG. 1, the SMP 102 may include a SMP server application 108. The SMP server application 108 may be a video sharing social networking service. For example, in some aspects, a user of the SMP 102 may be able to view video content generated by other users via the SMP server application 108. In some other examples, users of the SMP 102 may be able to communicate to each other via direct messaging or group messaging via the SMP server application 108.

As illustrated in FIG. 1, a client device 104(1) may include SMP client application 110 for providing access to the SMP 102. For example, the SMP client application 110 may capture user-generated content created by a user, upload the user-generated content to the SMP 102 for consumption by other users, and present a feed including user-generated content created by the other users to the user. In some aspects, the user-generated content may be video content items 112(1)-(n) and other content related to the video content items 112(1)-(n). Further, the user-generated content may be presented within feed information 114(1)-(n) transmitted to the SMP client applications 110(1)-(n) from the SMP server application 108. In some aspects, the feed information 114 may be personalized for each SMP client application 110 based upon a user and/or account associated with the SMP client application 110.

Further, as described in detail herein, the SMP client application 110 may be configured to create video stickers 116(1)-(n) and present the video stickers 116(1)-(n) within graphical user interfaces (GUIs) of the SMP client application 110. As used herein, in some aspects, a video sticker 116 may refer to a video clip including textual information, graphical effects, static images, and animated images. As illustrated in FIG. 1, the SMP client application 110 may include a sticker generation module 118 that presents a GUI for generating a video sticker 116 based on a video content item 112 received from the SMP server application 108. In particular, the GUI may receive one or more derivative attributes 120(1)-(n) for generating a video sticker 116 from a video content item 112. The derivative attributes 120 may include special effects to apply to the video content item 112 within the derivative video sticker 116, one or more captions to include within the derivative video sticker 116, an overlay sticker to include within the derivative video sticker 116, and/or trimming information identifying a portion of the video content item 112 to include in the derivative video sticker 116. Upon receipt of the derivative attributes 120 via the GUI, the sticker generation module 118 may generate a derivative video sticker 116 based on the video content item 112 and the derivative attributes 120. Further, the sticker generation module 118 may transmit the derivative video sticker 116 to the SMP server application 108 to be stored within a library of video stickers 116, and distributed to and/or consumed by other SMP client applications 110(2)-(n) and/or other client devices 104(2)-(n). In some other aspects, the sticker generation module 118 may receive the derivative attributes 120(1)-(n) via the GUI and transmit the derivative attributes 120(1)-(n) to the SMP server application 108, which may generate a derivative video sticker 116 based on the video content item 112 and the derivative attributes 120, and distribute the derivative video sticker 116 to other SMP client applications 110(2)-(n) and/or other client devices 104(2)-(n).

Figure 7:
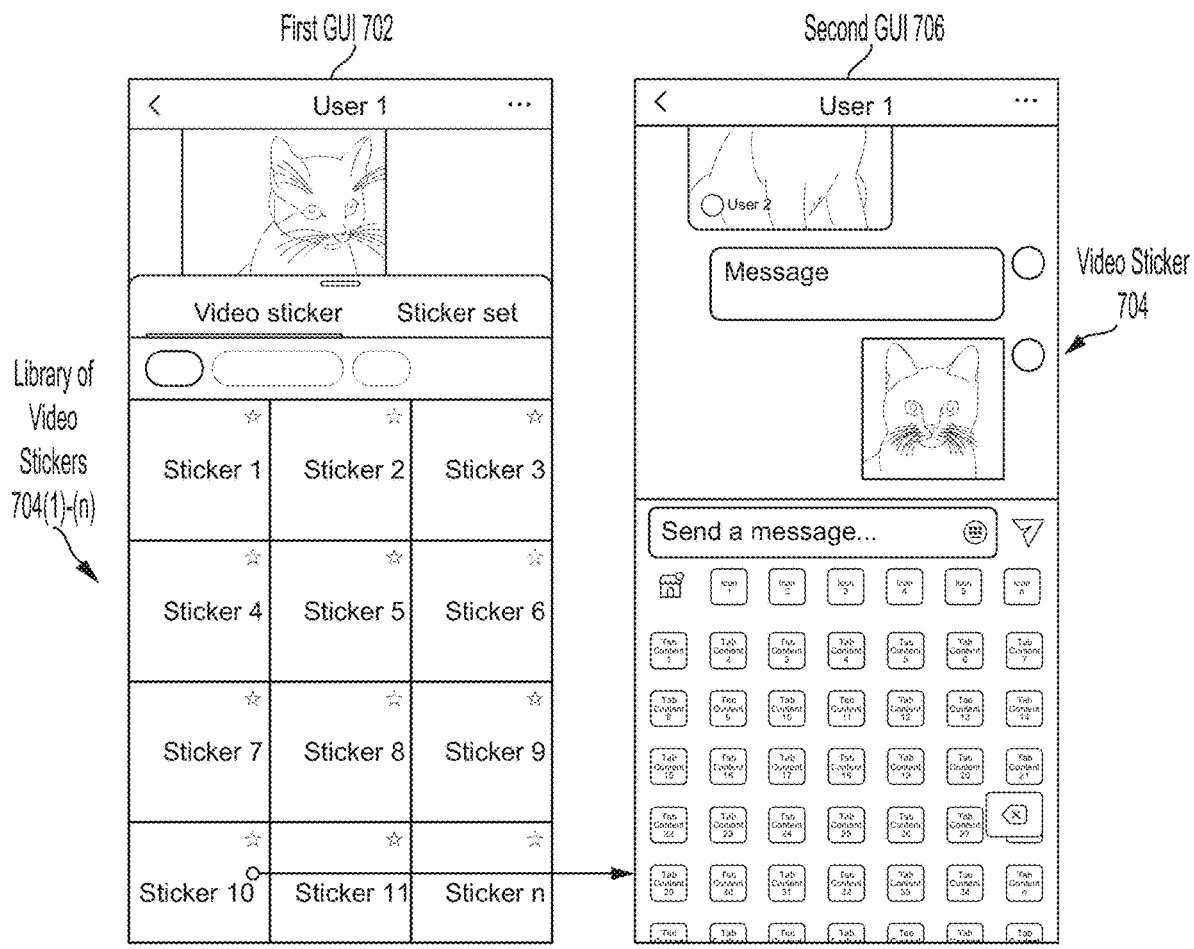
FIG. 7 illustrates example graphical user interfaces for inserting a video sticker into a message, in accordance with some aspects of the present disclosure.

Additionally, the SMP client application 110 may transmit messages 124(1)-(n) to other SMP client applications 110 on the other client devices 104(2)-(n) and receive messages 124(1)-(n) from other SMP client applications 110 on the other client devices 104(2)-(n). In some aspects, the SMP client application 110 may include a communication module 126 for receiving a message 124 from a user via a GUI and transmitting the message 124 to one or more to other SMP client applications 110. Further, the communication module 126 may receive messages 124(1)-(n) from other SMP client applications 110 and present the messages 124(1)-(n) to a user within the SMP client application 110 via a GUI. As described herein, in some aspects, the messages 124 may include derivative video stickers 116, as illustrated in FIG. 7.

In addition, in some aspects, the communication module 126 may manage the feed information 114. For example, the communication module 126 may be used to post user-generated content (e.g., a video content item 112) to the SMP server application 108 for distribution as the feed information 114 or post user-generated content (e.g., comments) in response to the feed information 114 received from the SMP server application 108. As described herein, in some aspects, the user-generated content may include derivative video stickers 116.

Figure 6:
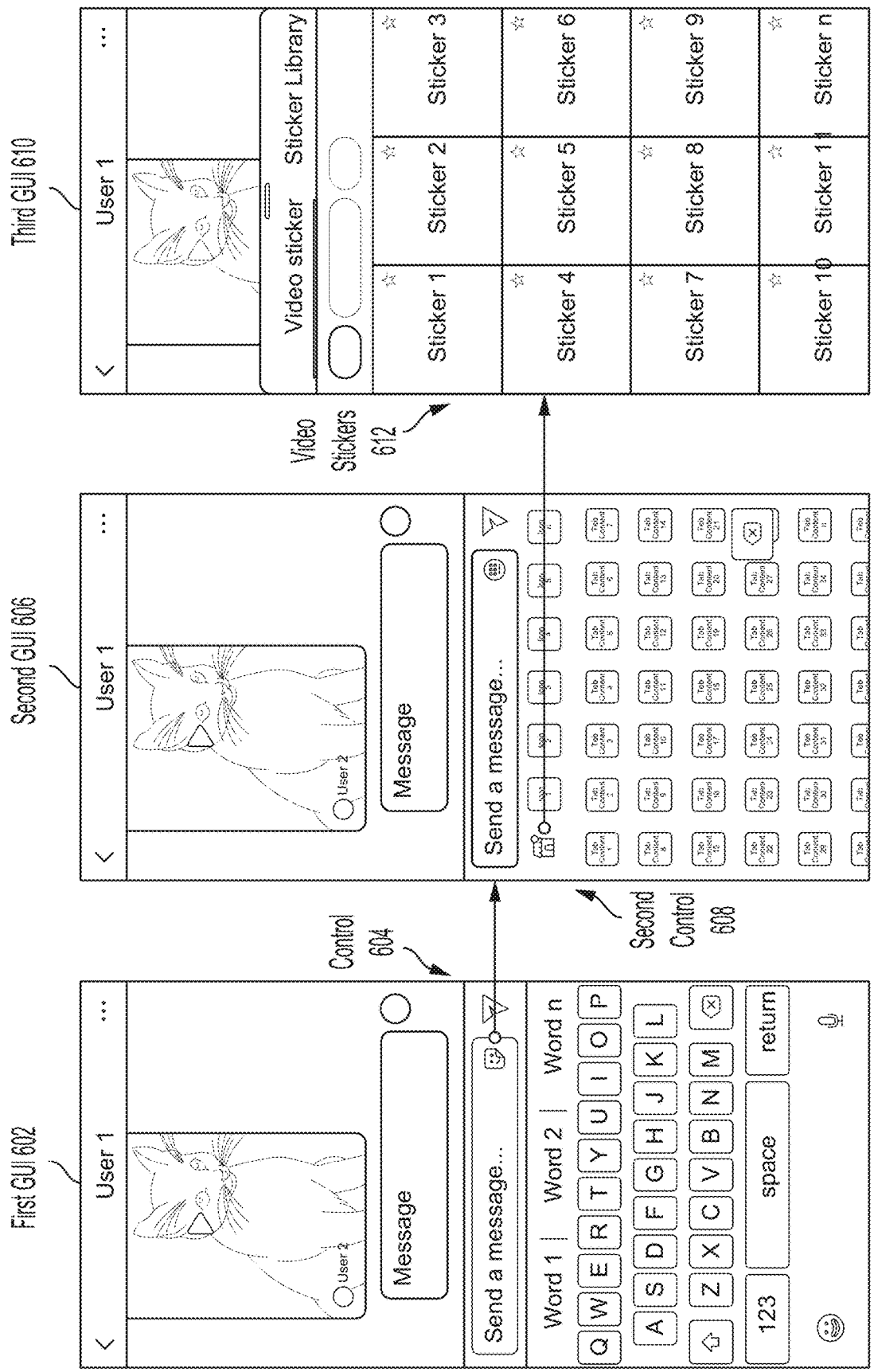
FIG. 6 illustrates example graphical user interfaces for viewing a collection of video stickers, in accordance with some aspects of the present disclosure.

Further, in some aspects, the communication module 126 may request access to the video stickers 116(1)-(n) of the SMP server application 108. For example, the communication module 126 may transmit library requests 128(1)-(n) to the SMP server application 108. In some aspects, the library request 128 may include one or more query terms identifying the type of video stickers 116 to provide to the SMP client application 110 in response to the library request 128. Upon receipt of the video stickers 116 from the SMP server application 108, the communication module 126 may natively present the video stickers 116 within a GUI of the SMP client application 110, as illustrated in FIGS. 6-7. Further, the video stickers 116 received in the library request may be stored on the client device 104 and presented for selection within GUIs of the SMP client application 110 for inclusion in messages 124(1)-(n) and feed information 114(1)-(n).

As illustrated in FIG. 1, the SMP server application 108 may include a content management module 130, a sticker generation module 132, the plurality of video content items 112(1)-(n), and the plurality of video stickers 116(1)-(n). The content management module 130 may manage the storage and distribution of the plurality of video content items 112(1)-(n) and the plurality of video stickers 116(1)-(n). In some aspects, the content management module 130 may transmit the plurality of video stickers 116(1)-(n) to the SMP client applications 110(1)-(n) in response to the plurality of library requests 128(1)-(n). Further, the content management module 130 may moderate content usage associated with the SMP 102 by restricting distribution and use of the video content items 112 and/or the video stickers 116. For example, the content management module 130 may receive flags 134(1)-(n) from the SMP client applications 110. In some aspects, a flag 134 may identify a video content item 112 or a video sticker 116 as inappropriate (e.g., the video content item or video sticker may include nudity, hate speech, or unlicensed content not permitted within the SMP system 100). In response to a flag 134 the SMP server application 108 may delete the video content item 112 or the video sticker 116 or mark the video content item 112 or video sticker 116 for later review. Further, if the flag 134 identifies a video content item 112, the content management module 130 may identify video stickers 116 derived from the video content item 112 and delete the video stickers 116 or mark the video stickers 116 for later review. In addition, the SMP server application 108 may transmit flag information 136 to the SMP client applications 110 that identifies a video content item 112 or a video sticker 116 that has been flagged and/or video stickers 116 derived from a video content item 112 that has been flagged. In response to the flag information 136, a SMP client application 110 may delete a locally-stored version of the video content item 112 and/or video sticker 116 identified within the flag information 136. In some aspects, the SMP client application 110 may remove the video content item 112 and/or video sticker 116 identified within the flag information 136 from messages 124(1)-(n) that have been previously transmitted between SMP client applications 110, and/or prevent presentation of the video sticker 116 identified within GUIs of the SMP client application.

As illustrated in FIG. 1, the sticker generation module 132 may generate video stickers 116 based on video content items 112 and derivative attributes 120 received from the SMP client applications 110(1)-(n). In some aspects, the derivative attributes 120 may include special effects to apply to the video content item 112 within the derivative video sticker 116, a caption to include within the derivative video sticker 116, an overlay sticker to include within the derivative video sticker 116, or trimming information identifying a portion of the video content item 112 to include in the derivative video sticker 116. Upon receipt of the derivative attributes 120 from a SMP client application 110, the sticker generation module 132 may generate a derivative video sticker 116 based on the corresponding video content item 112 and the derivative attributes 120. Further, the sticker generation module 132 may store the generated video sticker 116 with the plurality of stickers 116(1)-(n).

Figure 2:
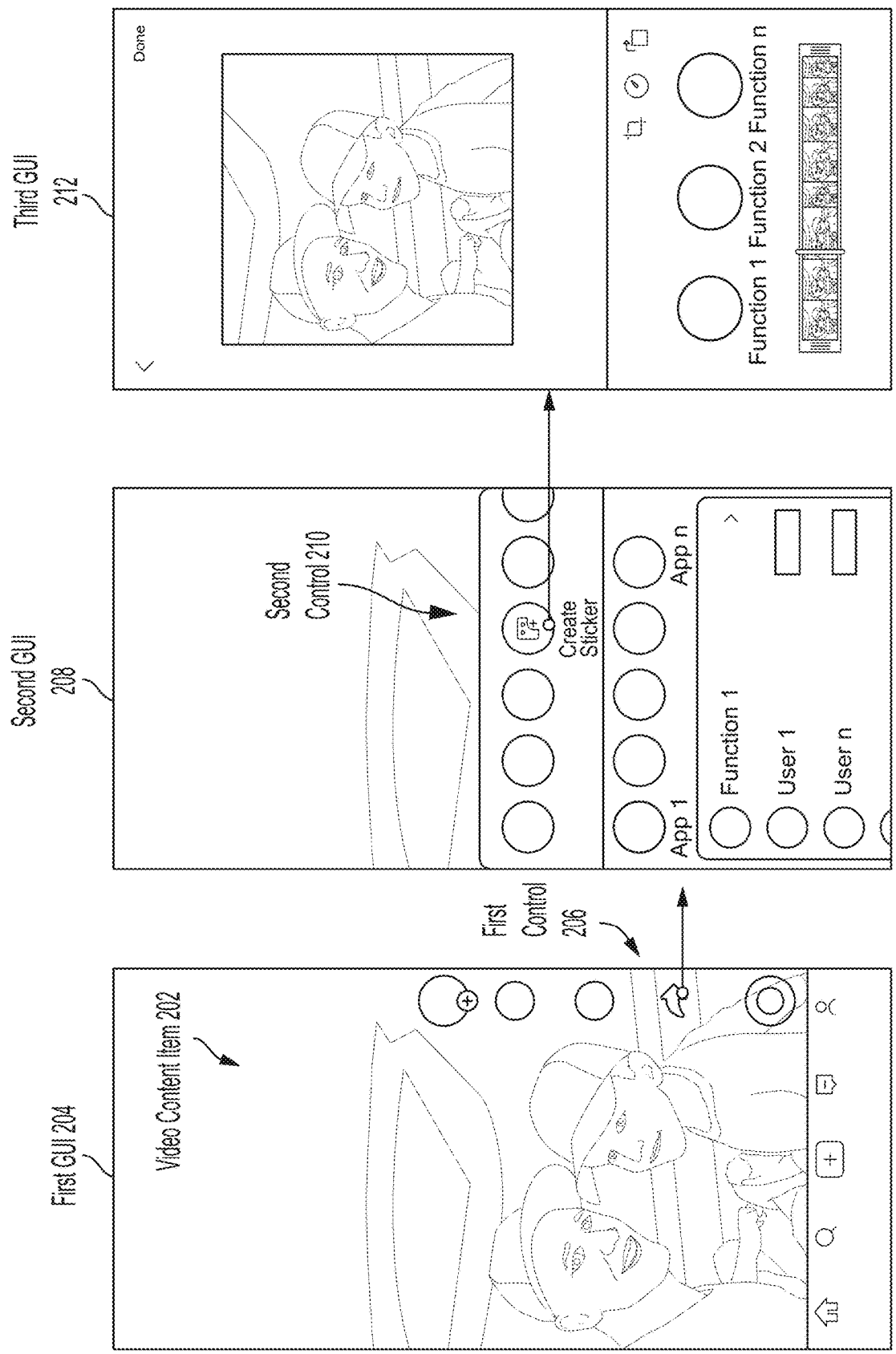
FIG. 2 illustrates an example of graphical user interfaces for initiating generation of a video sticker, in accordance with some aspects of the present disclosure.

FIG. 2 illustrates an example of graphical user interfaces for initiating generation of a video sticker, in accordance with some aspects of the present disclosure. As illustrated in FIG. 2, a user may endeavor to create a derivative video sticker from a video content item 202 displayed in a first GUI 204. As such, the user may select a first control 206 in the first GUI 204. In response to selection of the first control 206, the user may be presented with a second GUI 208. As illustrated in FIG. 2, the second GUI 208 may include a second control 210 for creating a video sticker. Upon selection of the second control 210, the sticker generation module 118 may present a third GUI 212 for providing derivative attributes for create a video sticker.

Figure 3:
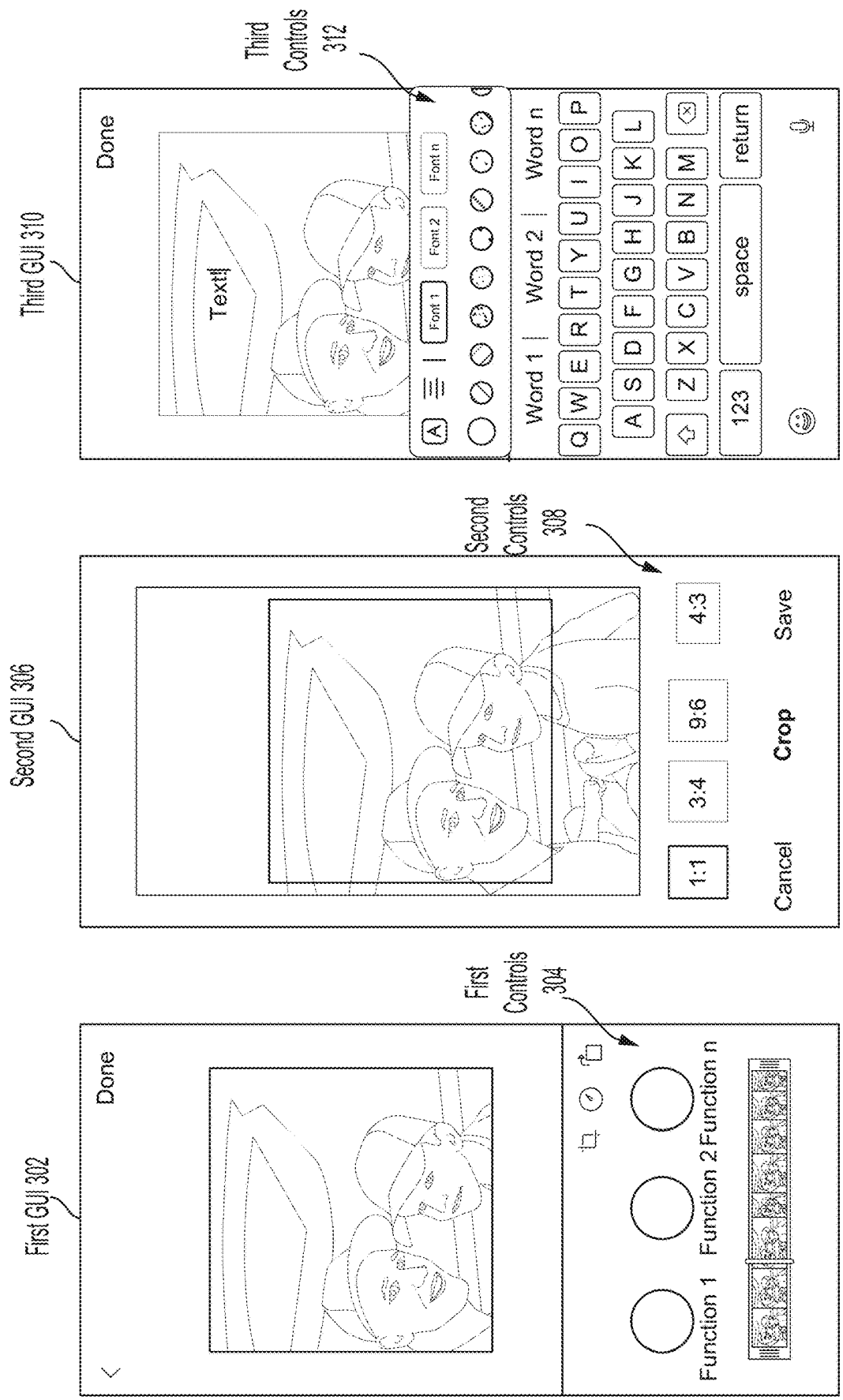
FIG. 3 illustrates an example of graphical user interfaces for designing a video sticker, in accordance with some aspects of the present disclosure.

FIG. 3 illustrates an example of graphical user interfaces for designing a video sticker, in accordance with some aspects of the present disclosure. As illustrated in FIG. 3, the sticker generation module 118 may present a first GUI 302 including one or more controls 304 for selecting one or more special effects (e.g., filters, transitions, motion graphic effects, animations, sounds, etc.) to apply and/or add to a video content item 112 to generate a video sticker 116, and trimming the video content item 112 to determine the portion of the video content item 112 to be used in the video sticker 116. Additionally, the sticker generation module 118 may present a second GUI 306 including one or more second controls 308 for cropping the video control item and selecting an aspect ratio for the video sticker. Further, the sticker generation module 118 may present a third GUI 310 including one or more third controls 312 for adding a caption to a video sticker and applying one or more special effects to the text of the caption.

Figure 4:
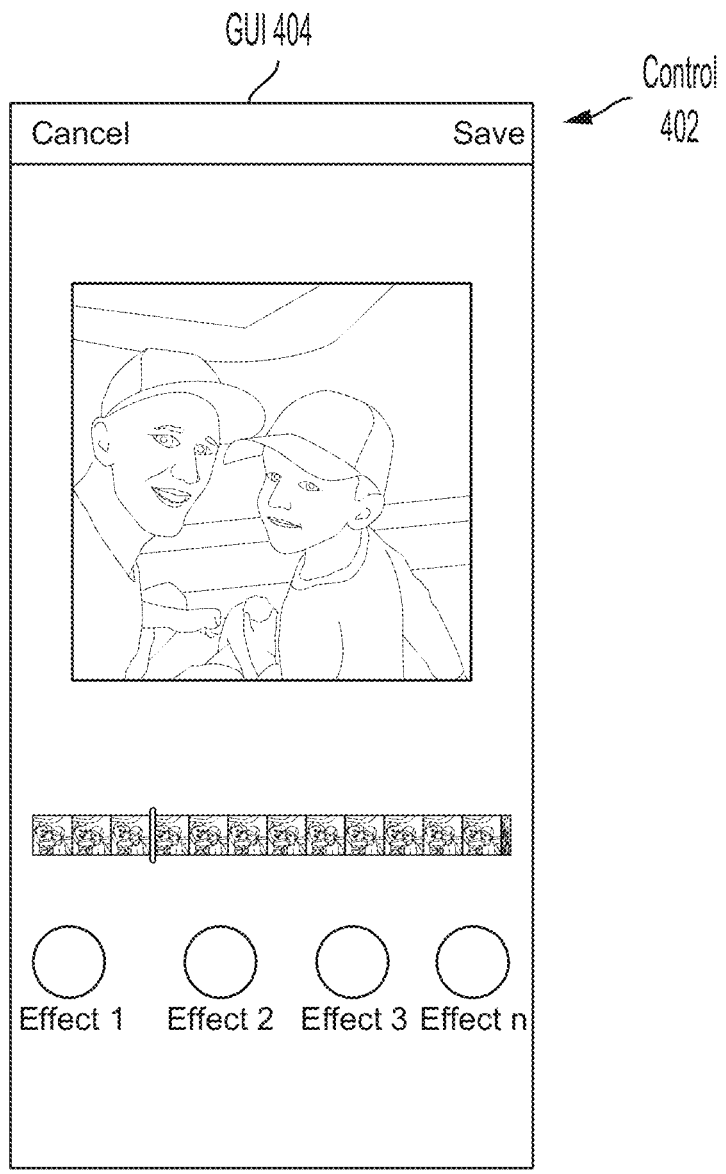
FIG. 4 illustrates an example graphical user interface for saving a video sticker design, in accordance with some aspects of the present disclosure.

FIG. 4 illustrates an example graphical user interface for saving a video sticker design, in accordance with some aspects of the present disclosure. Once a user has finished providing derivative attributes (e.g., the derivative attributes 120), the user may select a control 402 for generating and saving a video sticker within the GUI 404. In some aspects, the sticker generation module 118 may generate a derivative sticker 116 in response to selection of the control 402, and upload the derivative sticker to the SMP server application. In some other aspects, the sticker generation module 118 may transmit the derivative attributes to the SMP server application 108, which will generate the derivative sticker 116.

Figure 5:
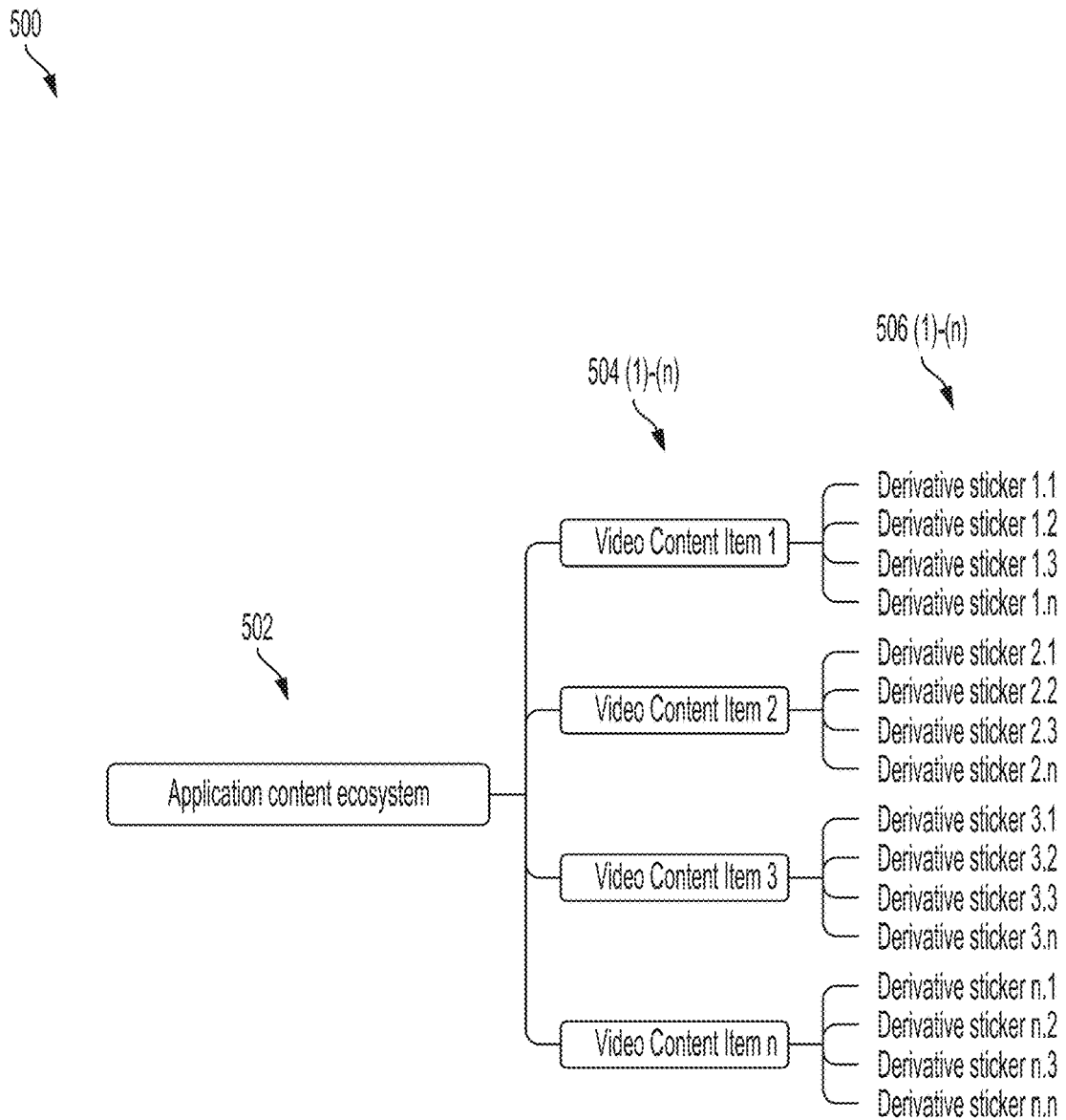
FIG. 5 illustrates an example graphical representation of a content ecosystem, in accordance with some aspects of the present disclosure.

FIG. 5 illustrates an example graphical representation 500 of a content ecosystem, in accordance with some aspects of the present disclosure. As illustrated in FIG. 5, the content ecosystem 502 of a SMP (e.g., the SMP 102) may include a plurality of video content items 504(1)-(n) (e.g., the video content items 112(1)-(n)). Further, as described in detail herein, users may create derivative stickers 506(1)-(n) based on the plurality of content items 504(1)-(n). Further, as described herein, in some aspects, the relationship between a content item 504 and one or more corresponding derivative stickers 506(1)-(n) may be used to moderate content within the content ecosystem 502. For example, if a content item 504 is flagged as including inappropriate content or unauthorized use of protected content, the derivative stickers 506 generated from the flagged content item 504 may also be flagged. In some examples, the flagged content may be removed from the content ecosystem 502 or added to a queue for additional review.

FIG. 6 illustrates example graphical user interfaces for viewing a collection of video stickers, in accordance with some aspects of the present disclosure. In some aspects, a user may endeavor to use a video sticker 116 during communications with another user. For example, a user may be using a first GUI 602 to transmit direct messages (e.g., the messages 124) to another user and receive direct messages (e.g., the messages 124) from the other user. Further, the user may select a first control 604 for adding content to a direct message. Upon selection of the first control 604, the communication module 126 may present a second GUI 606 for adding content to a message. As illustrated in FIG. 6, the second GUI may include a second control 608 for viewing a library of video stickers. Upon selection of the second control 608, the communication module 126 may present a third GUI 610 including a library of selectable video stickers 612(1)-(n). In some aspects, the library of selectable of video stickers 612 may include derivative video stickers.

FIG. 7 illustrates example graphical user interfaces for inserting a video sticker into a message, in accordance with some aspects of the present disclosure. In some aspects, the communication module 126 may present a first GUI 702 including a library of selectable video stickers 704(1)-(n) (e.g., the video stickers 116(1)-(n)). In some aspects, the library of selectable of video stickers 704(1)-(n) may include derivative video stickers. Upon selection of a video sticker 704 by a user, the communication module 126 may transmit the video sticker 704 within a message (e.g., a message 124) and display the video sticker within a second GUI 706 showing the messages exchanged within a conversation.

Figure 8:
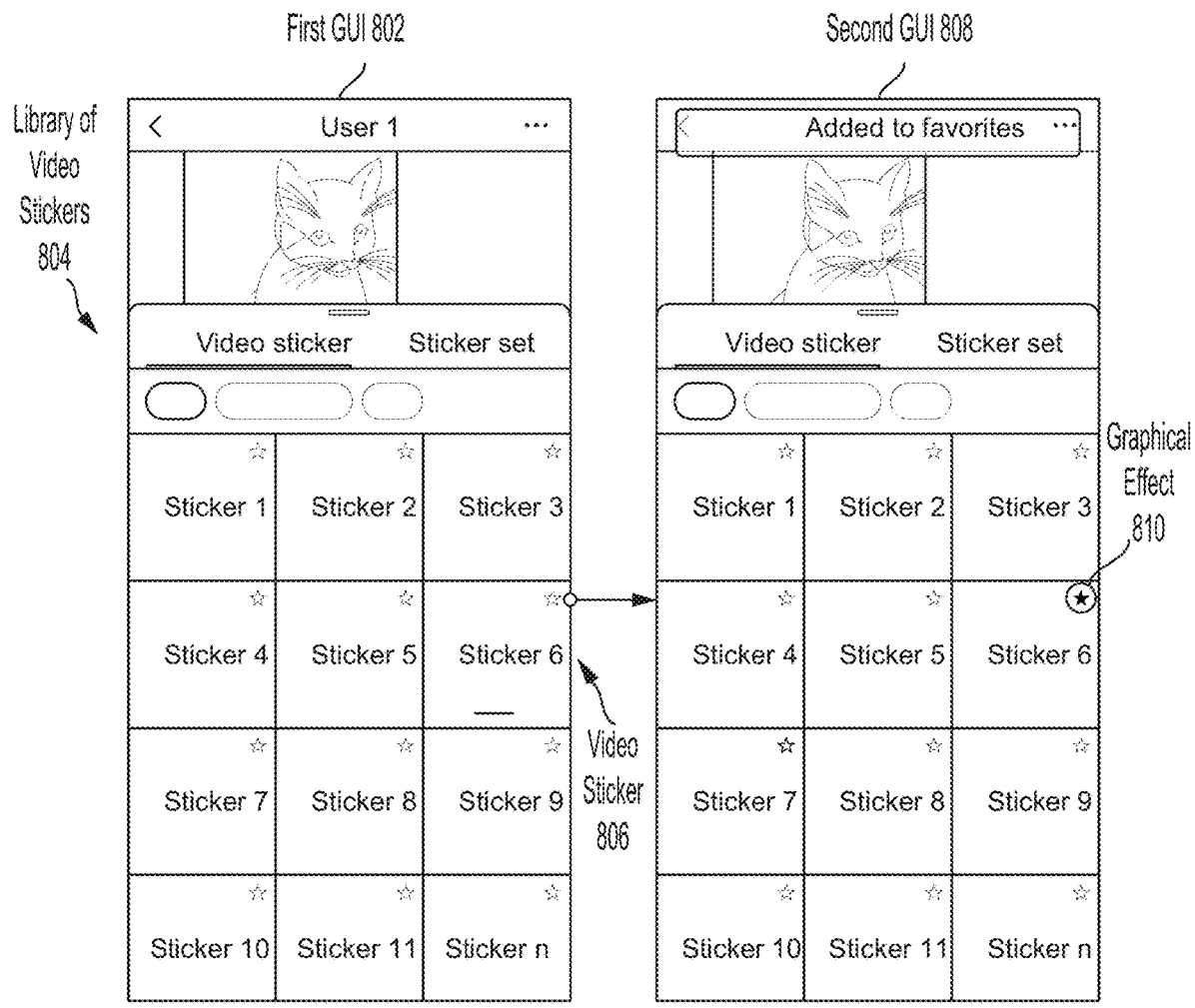
FIG. 8 illustrates example graphical user interfaces for favoriting a video sticker, in accordance with some aspects of the present disclosure.

FIG. 8 illustrates example graphical user interfaces for favoriting a video sticker, in accordance with some aspects of the present disclosure. In some aspects, the SMP client application may present a first GUI 802 including a library of selectable video stickers 804(1)-(n). Further, in some aspects, upon selection of a video sticker 806 with the first GUI 802, the video sticker 806 may be categorized as favorited content within the SMP client application. As such, the selected video sticker 806 may be subsequently displayed with a graphical effect and/or an area of the second GUI 808 associated with favorited/bookmarked content. For example, as illustrated in a second GUI 808, the selected video sticker 806 may displayed with a graphical effect 810 (e.g., a filled star) to identify that it is favorited content. In some aspects, the selection of the video sticker as favorited content may include pressing an area of the first GUI corresponding to the graphical effect 810.

Figure 9:
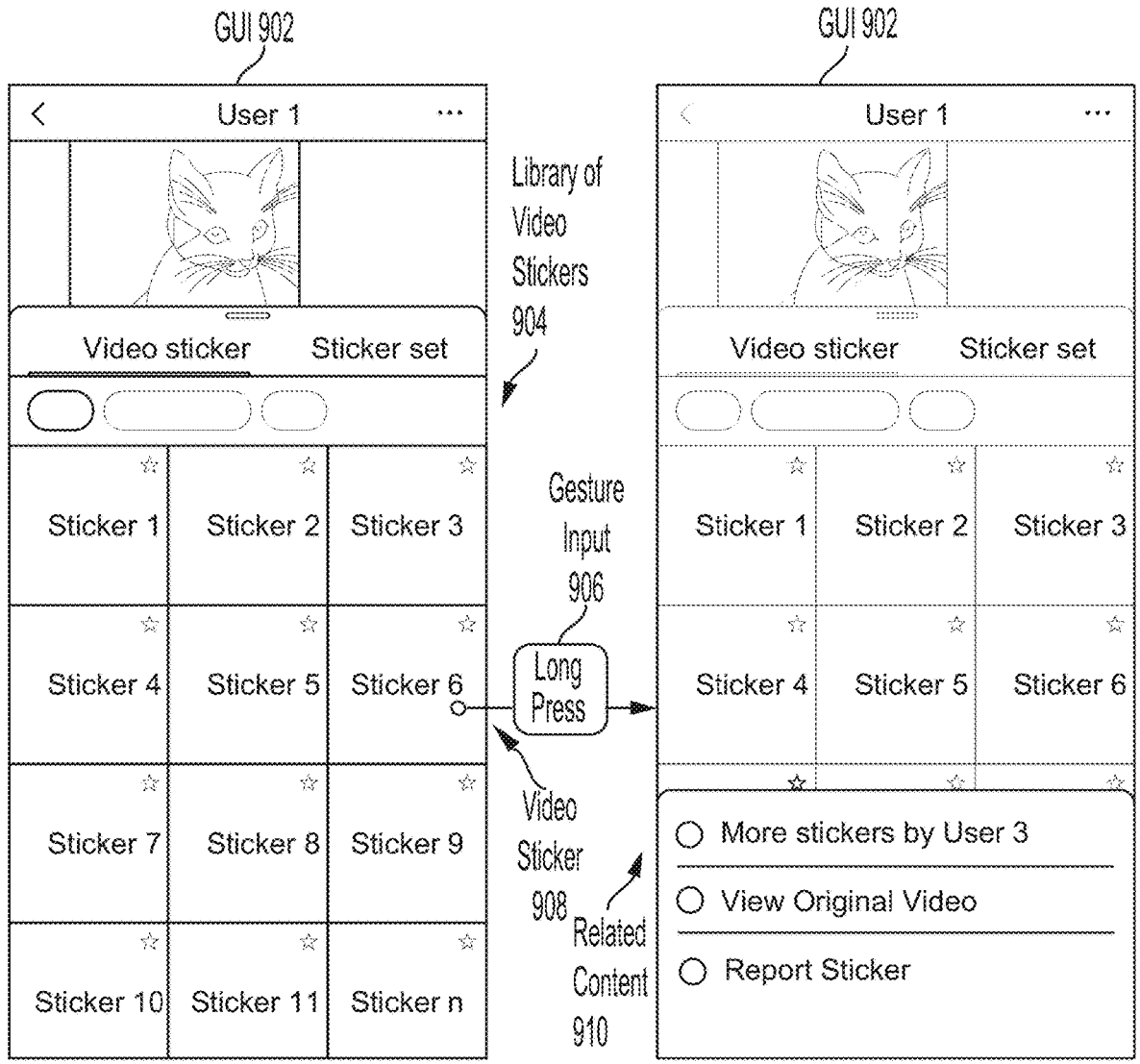
FIG. 9 illustrates example graphical user interfaces for viewing video sticker information, in accordance with some aspects of the present disclosure.

FIG. 9 illustrates example graphical user interfaces for viewing video sticker information, in accordance with some aspects of the present disclosure. In some aspects, the SMP client application may present a GUI 902 including a library of video stickers 904(1)-(n). Further, in some aspects, upon performance of gesture input 906 (e.g., a long press on an area of a touch screen interface or button of a client device 104) with respect to a video sticker 908 of the library of video stickers 904, related content 910 may be displayed within the SMP client application. For example, the SMP client application may update the GUI 902 to including the related content 910. As illustrated in FIG. 9, the related content 910 may include a control for viewing other video stickers created by the same creator as the video sticker 908, a control for viewing the video content item that the video sticker is derived from, and a control for flagging the video sticker 908. For example, in some aspects, the related content 910 may display source information (e.g., a selectable control corresponding to the original video item from which the video sticker derives). Further, in response to selection of the source information, the GUI 902 may display the video content item from which the video sticker derives.

EXAMPLE PROCESSES

Figure 10:
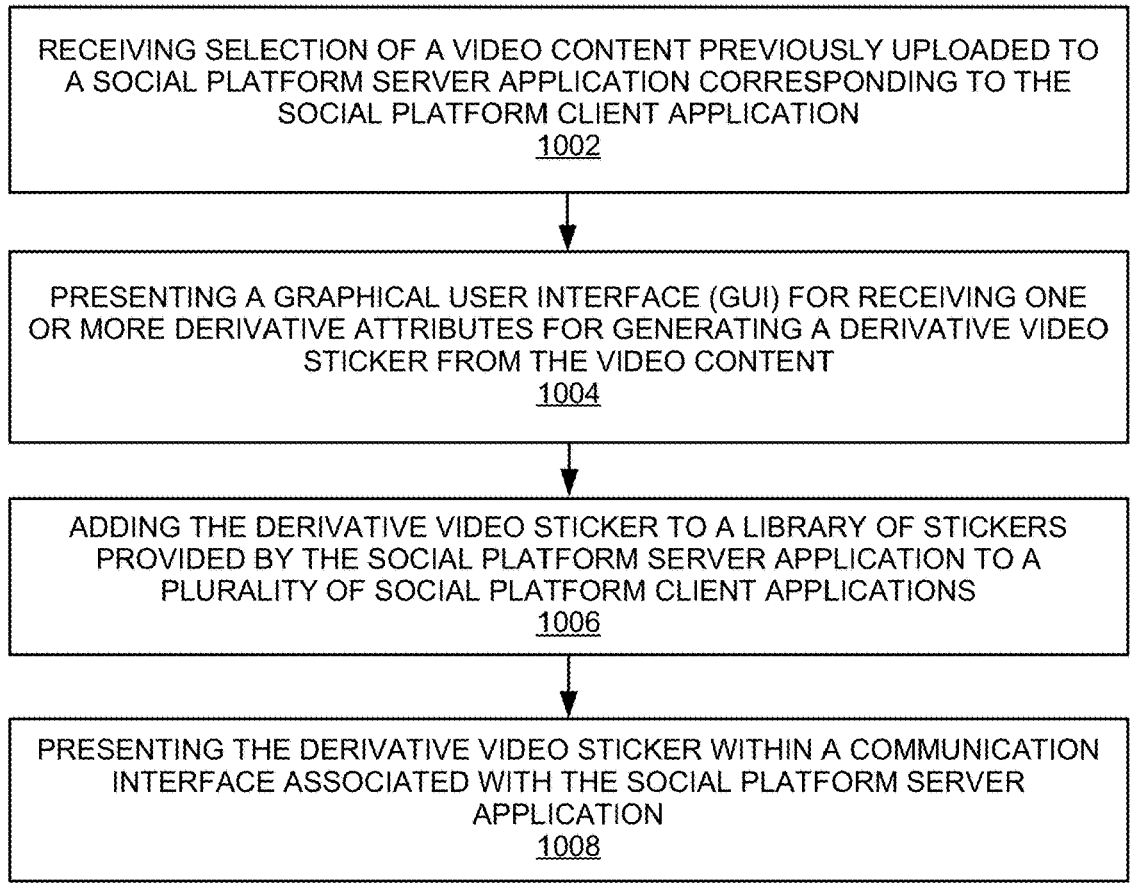
FIG. 10 is a flow diagram illustrating an example method for creating derivative video stickers on a client device, in accordance with some aspects of the present disclosure.

FIG. 10 is a flow diagram illustrating an example method for creating derivative video stickers on a client device, in accordance with some aspects of the present disclosure.

The process described in FIG. 10 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the SMP client application 110. By way of example and not limitation, the method 1000 is described in the context of FIGS. 1-9 and 12. For example, the operations may be performed by one or more of the SMP client application 110, the sticker generation module 118, and/or the communication module 126.

At block 1002, the method 1000 may include receiving selection of a video content item previously uploaded to a SMP server application corresponding to the SMP client application. For example, the SMP client application 110 may receive a video content item 112 from the SMP server application 108, as illustrated in FIG. 2. Further, the video content item 112 may be user-generated content provided by another SMP client application 110 to the SMP server application 108.

Accordingly, the client device 104, the system/device 1200, and/or the processor 501 executing the SMP client application 110 may provide means receiving selection of a video content item previously uploaded to a SMP server application corresponding to the SMP client application.

At block 1004, the method 1000 may include presenting a graphical user interface (GUI) for receiving one or more derivative attributes for generating a derivative video sticker from the video content item. For example, the sticker generation module 118 may receive the derivative attributes 120(1)-(n) via a GUI, as illustrated in FIGS. 2-3.

Accordingly, the client device 104, the system/device 1200, and/or the processor 501 executing the sticker generation module may provide means for presenting a graphical user interface (GUI) for receiving one or more derivative attributes for generating a derivative video sticker from the video content item.

At block 1006, the method 1000 may include adding the derivative video sticker to a library of stickers provided by the SMP server application to a plurality of SMP client applications. For example, the SMP client application 110 may generate a video sticker 116 and transmit the video sticker 116 to the SMP server application 108 to be stored with the plurality of video stickers 116 made available to other SMP client applications 110.

Accordingly, the client device 104, the system/device 1200, and/or the processor 501 executing the sticker generation module 118 may provide means for adding the derivative video sticker to a library of stickers provided by the SMP server application to a plurality of SMP client applications.

At block 1008, the method 1000 may include presenting the derivative video sticker within a communication interface associated with the SMP server application. For example, the communication module 126 may transmit a message to another SMP client application 110 including the video sticker 116, as illustrated in FIGS. 6-7. As another example, the communication module 126 may add the video sticker 116 to user-generated content (e.g., a video content item 112) to be distributed by the SMP server application 108 as feed information.

Accordingly, the client device 104, the system/device 1200, and/or the processor 501 executing the communication module 126 may provide means for presenting the derivative video sticker within a communication interface associated with the SMP server application.

In some aspects, the techniques described herein relate to the method 1000, further including generating the derivative video sticker from the video content item by applying the one or more derivative attributes to the video content item.

In some aspects, the techniques described herein relate to the method 1000, wherein the one or more derivative attributes include at least one of: a sticker effect to apply to the video content item within the derivative video sticker; a caption to include within the derivative video sticker; an overlay sticker to include within the derivative video sticker; or trimming information identifying a portion of the video content item to include in the derivative video sticker.

In some aspects, the techniques described herein relate to the method 1000, wherein the communication interface is a direct messaging interface for communicating with a SMP client application on another device.

In some aspects, the techniques described herein relate to the method 1000, wherein presenting the derivative video sticker includes presenting a plurality of stickers for selection for use within the SMP client application, the plurality of stickers including the derivative video sticker.

In some aspects, the techniques described herein relate to the method 1000, further including: receiving selection of the derivative video sticker within sticker selection interface of the SMP client application; and displaying derivation information associated with the derivative video sticker based upon the selection, the derivation information including an account of a creator of the derivative video sticker.

In some aspects, the techniques described herein relate to the method 1000, further including: receiving selection of the derivative video sticker within sticker selection interface of the SMP client application; and adding the derivative video sticker to a collection of favorited stickers based upon the selection.

In some aspects, the techniques described herein relate to the method 1000, further including: receiving flag information from the SMP server application, the flag information identifying the video content item and/or the derivative video sticker; and preventing access to the derivative video sticker via the SMP client application based upon the flag information.

In some aspects, the techniques described herein relate to the method 1000, further including displaying source information of the derivative video sticker, the source information corresponding to the video content item; and displaying the video content item in response to selection of a control associated with the source information.

While the operations are described as being implemented by one or more computing devices, in other examples various systems of computing devices may be employed. For instance, a system of multiple devices may be used to perform any of the operations noted above in conjunction with each other.

Figure 11:
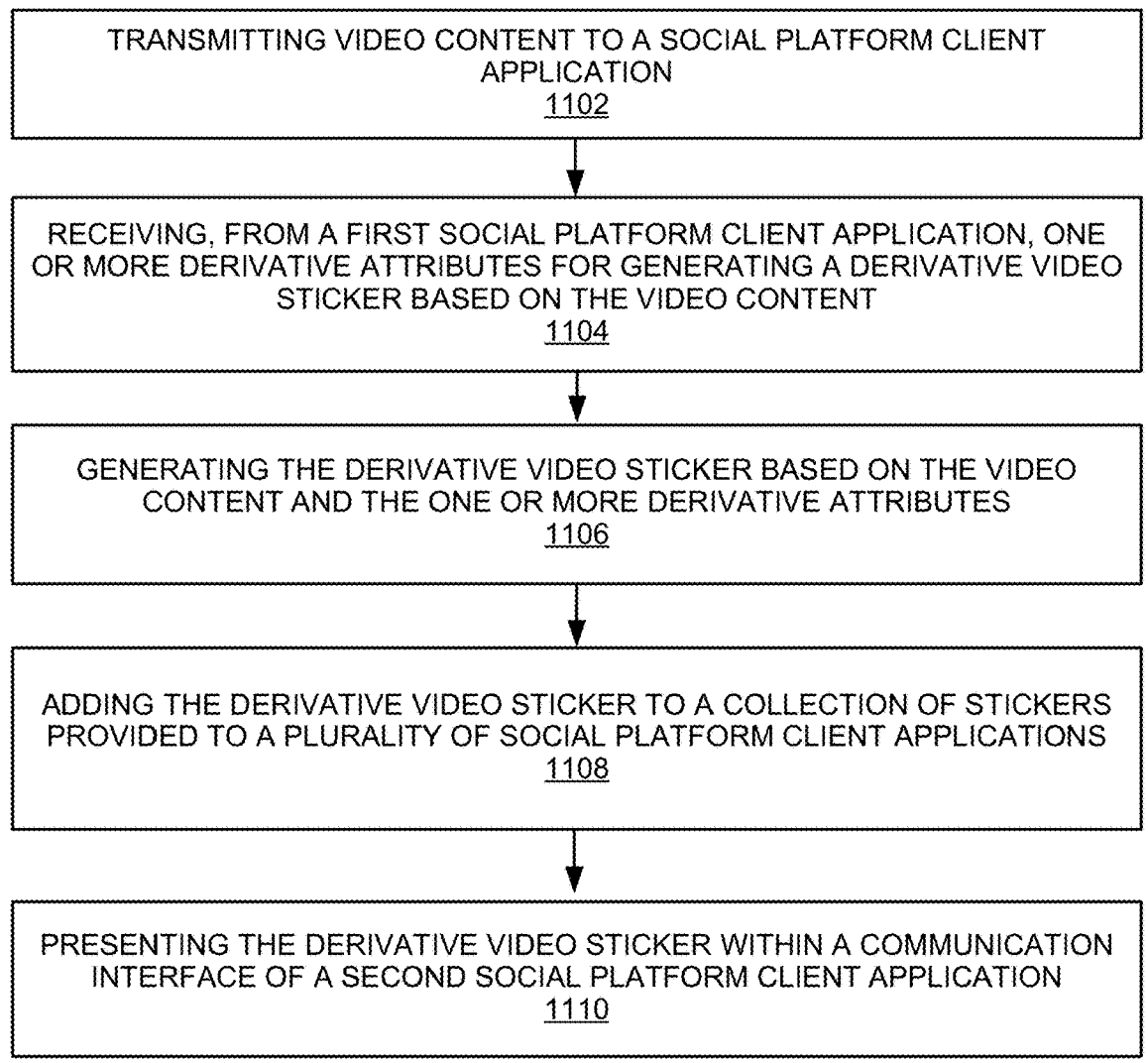
FIG. 11 is a flow diagram illustrating an example method for creating derivative video stickers on a server device, in accordance with some aspects of the present disclosure.

FIG. 11 is a flow diagram illustrating an example method for creating derivative video stickers on a server device, in accordance with some aspects of the present disclosure.

The process described in FIG. 11 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the SMP server application 108. By way of example and not limitation, the method 1100 is described in the context of FIGS. 1-9 and 12. For example, the operations may be performed by one or more of the SMP server application 108, the content management module 130, and/or the sticker generation module 132.

At block 1102, the method 1100 may include transmitting video content item to a SMP client application. For example, the SMP server application 108 may transmit a video content item 112 to a SMP client application 110. Further, the video content item 112 may be user-generated content provided by another SMP client application 110 to the SMP server application 108.

Accordingly, the client device 104, the system/device 1200, and/or the processor 501 executing the SMP server application 108 may provide means for transmitting video content item to a SMP client application.

At block 1104, the method 1100 may include receiving, from a first SMP client application, one or more derivative attributes for generating a derivative video sticker based on the video content item. For example, the sticker generation module 132 may receive derivative attributes 120 for generating a video sticker 116 based on the video content item 112 from the SMP client application 110.

Accordingly, the client device 104, the system/device 1200, and/or the processor 501 executing the sticker generation module 132 may provide means for receiving, from a first SMP client application, one or more derivative attributes for generating a derivative video sticker based on the video content item.

At block 1106, the method 1100 may include generating the derivative video sticker based on the video content item and the one or more derivative attributes. For example, the sticker generation module 132 may generate a video sticker 116 based on the derivative attributes 120 and the video content item 112.

Accordingly, the client device 104, the system/device 1200, and/or the processor 501 executing the sticker generation module 132 may provide means for generating the derivative video sticker based on the video content item and the one or more derivative attributes.

At block 1108, the method 1100 may include adding the derivative video sticker to a collection of stickers provided to a plurality of SMP client applications. For example, the content management module 130 may store the video sticker 116 among the plurality of video stickers 116 for distribution to the SMP client applications 110.

Accordingly, the client device 104, the system/device 1200, and/or the processor 501 executing the content management module 130 may provide means for adding the derivative video sticker to a collection of stickers provided to a plurality of SMP client applications.

At block 1110, the method 1100 may include presenting the derivative video sticker within a communication interface of a second SMP client application. For example, the SMP server application 108 may receive a library request 128 from another SMP client application 110 and transmit the video sticker 116 to the other SMP client application 110 in response to the library request 128. Upon receipt of the video sticker 116, the SMP client application 110 may present the video sticker 116 within a messaging GUI of the SMP client application 110. Further, the SMP client application 110 may transmit messages including the video sticker 116 to other SMP client applications 110. In addition, in some examples, the SMP server application 108 may transmit feed information 114 including a derivative video sticker 116.

Accordingly, the client device 104, the system/device 1200, and/or the processor 501 executing the content management module 130 may provide means for presenting the derivative video sticker within a communication interface of a second SMP client application.

In some aspects, the techniques described herein relate to the method 1100, wherein presenting the derivative video sticker comprises receiving a request for one or more stickers from the second SMP client application and transmitting the derivative video sticker to the second SMP client application in response to the request.

In some aspects, the techniques described herein relate to the method 1100, further comprising receiving flag information identifying the video content item and removing the derivative video sticker from the collection of stickers based on the flag information.

In some aspects, the techniques described herein relate to the method 1100, further comprising receiving flag information identifying the video content item and removing the derivative video sticker from the communication interface based on the flag information.

In some aspects, the techniques described herein relate to the method 1100, wherein the one or more derivative attributes include at least one of: a sticker effect to apply to the video content item within the derivative video sticker; a caption to include within the derivative video sticker; an overlay sticker to include within the derivative video sticker; or trimming information identifying a portion of the video content item to include in the derivative video sticker.

Illustrative Computing Device

Figure 12:
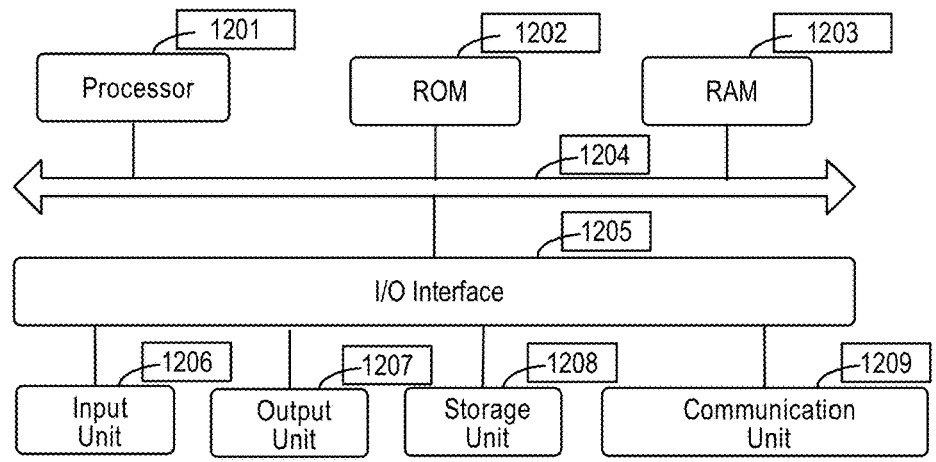
FIG. 12 is a block diagram illustrating an example of a hardware implementation for a computing device(s), in accordance with some aspects of the present disclosure.

FIG. 12 illustrates a block diagram of an example computing system/device 1200 (e.g., the SMP 102, the client device 104) suitable for implementing example embodiments of the present disclosure. The system/device 1200 may be a general-purpose computer, a physical computing device, or a portable electronic device, or may be practiced in distributed cloud computing environments where tasks are performed by remote processing devices that are linked through a communication network. The system/device 1200 can be used to implement any of the processes described herein.

As depicted, the system/device 1200 includes a processor 1201 which is capable of performing various processes according to a program stored in a read only memory (ROM) 1202 or a program loaded from a storage unit 1208 to a random-access memory (RAM) 1203. In the RAM 1203, data required when the processor 1201 performs the various processes or the like is also stored as required. The processor 1201, the ROM 1202 and the RAM 1203 are connected to one another via a bus 1204. An input/output (I/O) interface 1205 is also connected to the bus 1204.

The processor 1201 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 1200 may have multiple processors, such as an application-specific integrated circuit chip that is slaved in time to a clock which synchronizes the main processor.

A plurality of components in the system/device 1200 are connected to the I/O interface 1205, including an input unit 1206, such as a keyboard, a mouse, microphone) or the like; an output unit 1207 including a display such as a cathode ray tube (CRT), a liquid crystal display (LCD), or the like, and a speaker or the like; the storage unit 1208, such as disk and optical disk, and the like; and a communication unit 1209, such as a network card, a modem, a wireless transceiver, or the like. The communication unit 1209 allows the system/device 1200 to exchange information/data with other devices via a communication network, such as the Internet, various telecommunication networks, and/or the like.

The methods and processes described above, such as the method 1100, can also be performed by the processor 1201. In some embodiments, the method 1100 can be implemented as a computer software program or a computer program product tangibly included in the computer readable medium, e.g., storage unit 1208. In some embodiments, the computer program can be partially or fully loaded and/or embodied to the system/device 1200 via ROM 1202 and/or communication unit 1209. The computer program includes computer executable instructions that are executed by the associated processor 1201. When the computer program is loaded to RAM 1203 and executed by the processor 1201, one or more acts of the method 1100 described above can be implemented. Alternatively, processor 1201 can be configured via any other suitable manners (e.g., by means of firmware) to execute the methods 1000 or 1100 in other embodiments.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
   receiving selection of a video content item previously uploaded to a social media platform (SMP) server application corresponding to a SMP client application;
   presenting a graphical user interface (GUI) for receiving one or more derivative attributes for generating a derivative video sticker from the video content item;
   generating the derivative video sticker from the video content item based on the one or more derivative attributes;
   adding the derivative video sticker to a library of stickers provided by the SMP server application to a plurality of SMP client applications; and
   presenting the derivative video sticker within a communication interface associated with the SMP server application.

2. The method of claim 1, wherein the one or more derivative attributes include at least one of:
   a sticker effect to apply to the video content item within the derivative video sticker;
   a caption to include within the derivative video sticker;

an overlay sticker to include within the derivative video sticker; or trimming information identifying a portion of the video content item to include in the derivative video sticker.

3. The method of claim 1, wherein the communication interface is a direct messaging interface for communicating with a SMP client application on another device.

4. The method of claim 1, wherein presenting the derivative video sticker comprises presenting a plurality of stickers for selection for use within the SMP client application, the plurality of stickers including the derivative video sticker.

5. The method of claim 1, further comprising:
receiving selection of the derivative video sticker within a sticker selection interface of the SMP client application; and
displaying derivation information associated with the derivative video sticker based upon the selection, the derivation information including an account of a creator of the derivative video sticker.

6. The method of claim 1, further comprising:
receiving selection of the derivative video sticker within a sticker selection interface of the SMP client application; and
adding the derivative video sticker to a collection of favorited stickers based upon the selection.

7. The method of claim 1, further comprising:
receiving flag information from the SMP server application, the flag information identifying the video content item and/or the derivative video sticker; and
preventing access to the derivative video sticker via the SMP client application based upon the flag information.

8. The method of claim 1, further comprising:
acquiring source information of the derivative video sticker, the source information corresponding to the video content item; and
displaying the video content item in response to selection of a control associated with the source information.

9. A non-transitory computer-readable device having instructions thereon that, when executed by at least one computing device, causes the at least one computing device to perform operations comprising:
receiving selection of video content item previously uploaded to a social media platform (SMP) server application corresponding to a SMP client application;
presenting a graphical user interface (GUI) for receiving one or more derivative attributes for generating a derivative video sticker from the video content item;
generating the derivative video sticker from the video content item based on the one or more derivative attributes;
adding the derivative video sticker to a library of stickers provided by the SMP server application to a plurality of SMP client applications; and
presenting the derivative video sticker within a communication interface associated with the SMP server application.

10. The non-transitory computer-readable device of claim 9, wherein the one or more derivative attributes include at least one of:
a sticker effect to apply to the video content item within the derivative video sticker;
a caption to include within the derivative video sticker;
an overlay sticker to include within the derivative video sticker; or
trimming information identifying a portion of the video content item to include in the derivative video sticker.

11. The non-transitory computer-readable device of claim 9, wherein the communication interface is a direct messaging interface for communicating with a SMP client application on another device.

12. The non-transitory computer-readable device of claim 9, wherein presenting the derivative video sticker comprises presenting a plurality of stickers for selection for use within SMP client application, the plurality of stickers including the derivative video sticker.

13. The non-transitory computer-readable device of claim 9, wherein the instructions cause the at least one computing device to perform operations further comprising:
receiving selection of the derivative video sticker within sticker selection interface of the SMP client application; and
displaying derivation information associated with the derivative video sticker based upon the selection, the derivation information including an account of a creator of the derivative video sticker.

14. The non-transitory computer-readable device of claim 9, wherein the instructions cause the at least one computing device to perform operations further comprising:
receiving selection of the derivative video sticker within sticker selection interface of the SMP client application; and
adding the derivative video sticker to a collection of favorited stickers based upon the selection.

15. The non-transitory computer-readable device of claim 9, wherein the instructions cause the at least one computing device to perform operations further comprising:
acquiring source information of the derivative video sticker, the source information corresponding to the video content item; and
displaying the video content item in response to selection of a control associated with the source information.

16. A system comprising:
a memory storing instructions thereon; and
at least one processor coupled with the memory and configured by the instructions to:
transmit a video content item to a first social media platform (SMP) client application;
receive, from the first SMP client application, one or more derivative attributes for generating a derivative video sticker based on the video content item;
generate the derivative video sticker based on the video content item and the one or more derivative attributes;
add the derivative video sticker to a collection of stickers provided to a plurality of SMP client applications; and
present the derivative video sticker within a communication interface of a second SMP client application.

17. The system of claim 16, wherein to present the derivative video sticker, the at least one processor is further configured by the instructions to:
receive a request for one or more stickers from the second SMP client application; and
transmit the derivative video sticker to the second SMP client application in response to the request.

18. The system of claim 16, wherein the at least one processor is further configured by the instructions to:
receive flag information identifying the video content item; and
remove the derivative video sticker from the collection of stickers based on the flag information.

19. The system of claim 16, wherein the at least one processor is further configured by the instructions to:
   receive flag information identifying the video content item; and
   remove the derivative video sticker from the communication interface based on the flag information.

20. The system of claim 16, wherein the one or more derivative attributes include at least one of:
   a sticker effect to apply to the video content item within the derivative video sticker;
   a caption to include within the derivative video sticker;
   an overlay sticker to include within the derivative video sticker; or
   trimming information identifying a portion of the video content item to include in the derivative video sticker.

* * * * *